April 2, 1940.   H. G. DICKERSON   2,195,561
SPEED CONTROL DEVICE
Filed April 19, 1939
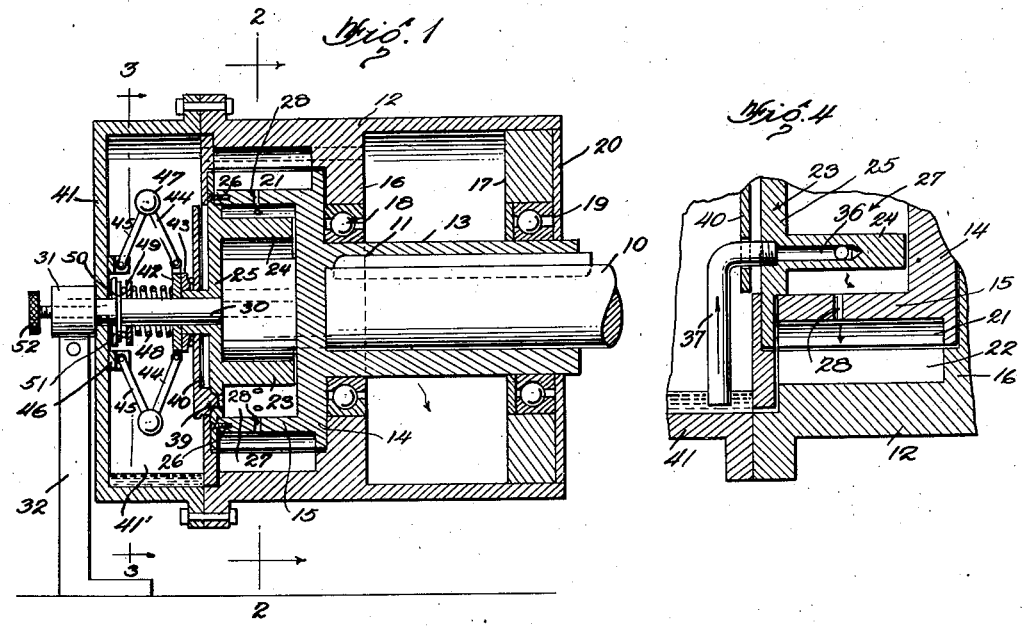
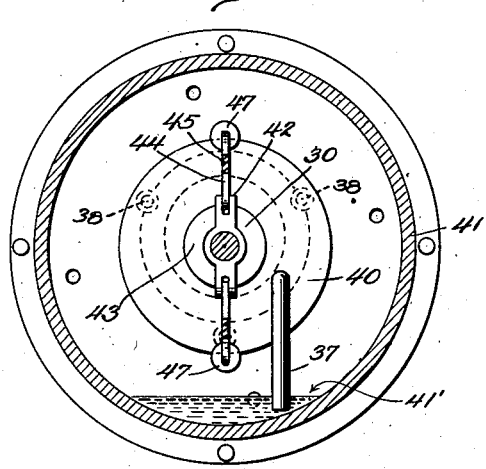
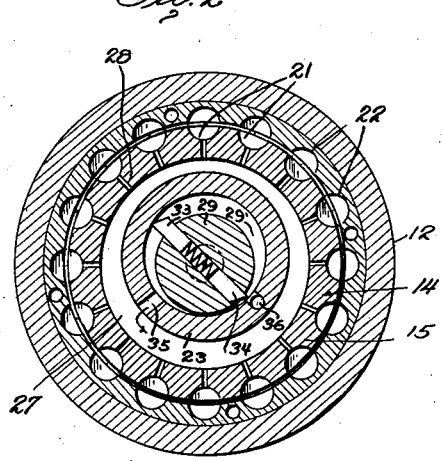
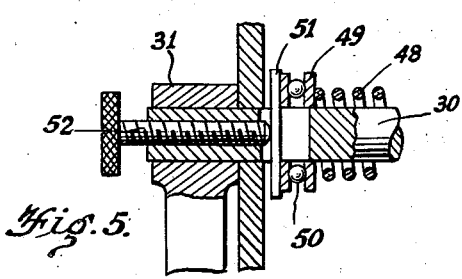
Inventor
Henry G. Dickerson
By Watson, Cole, Grindle & Watson
Attorney Patented Apr. 2, 1940

2,195,561

UNITED STATES PATENT OFFICE 2,195,561

SPEED CONTROL DEVICE

Henry G. Dickerson, Richmond, Va., assignor to Henry Wyatt Dickerson, Richmond, Va.

Application April 19, 1939, Serial No. 268,847

11 Claims. (Cl. 192—58)

The present invention relates to variable speed drives and more particularly to the type of drive employing a fluid transmission medium, such as oil, water, or a gas. The device of the present invention preferably employs a liquid medium, for example oil, but may in certain applications employ a gas as the power transmission medium, for example air.

Many transmissions of the general type described above are known, usually being designated as hydraulic clutches or hydraulic drives. The present invention differs from such devices in its general object, which is the provision of a device which, although similar in certain respects to the previously known hydraulic clutches and hydraulic drives, is primarily intended as a variable speed drive, or device for controlling the speed of power driven machinery, for example textile machinery and the like, in which a more or less delicate speed regulation is desirable. In view of this consideration, it is an object of the present invention to provide a device of the character described, which is capable of a very wide range of transmission ratios, and which, at the same time, is readily and easily adjusted over said range.

Another object is the provision of a device of the character described, which is capable of transmitting more power, for its size, than previously known hydraulic drives, due to the novel shape and relation of the driving and driven elements.

In the previously known devices of the general character in question, in which a pump has been employed, such as a gear pump or a vane-type pump, the pump has usually been associated with the driving element or the driven element in such a manner that the power is transmitted directly through the pump elements, which accordingly resulted in a limitation on the power capable of transmission, in accordance with the size and strength of the pump employed. It is an object of the present invention to avoid this disadvantage by causing the power to be transmitted directly from the driving to the driven element, through the fluid medium, the pump being employed solely for the purpose of maintaining the fluid medium at the desired pressure.

It is a further object of the present invention to provide a device of the character described in which the pressure of the fluid medium is automatically controlled, by means of a suitable governor which in turn is controlled by the speed of the driven element, so as to maintain said speed constant. Another object is the provision, in a device of the character described, of manually operated means for adjusting the aforesaid governor, so that the speed of the driven element may be varied as desired.

A further general object of the present invention is the provision of a device of the character described, which is of simple but rugged construction and is economical to manufacture.

Other and further objects, features and advantages of the present invention will be apparent to one skilled in the art from the following description taken in connection with the accompanying drawing in which:

Figure 1 is a longitudinal vertical section through a variable speed drive constructed in accordance with the present invention;

Figure 2 is a transverse section on line 2—2 of Figure 1;

Figure 3 is a transverse section on line 3—3 of Figure 1; and

Figures 4 and 5 are fragmentary details of certain portions of the mechanism illustrated in Figure 1.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

Referring to Figure 1, the variable speed drive of the present invention comprises generally a driving shaft 10, on which is secured a driving element 11, and on which is journalled a driven element 12. Although it is apparent that the driving element 11 might be made integral with the shaft 10, in the present embodiment, the element 11 is illustrated as comprising a sleeve 13, splined to the shaft 10, and a disc portion 14, integral with the sleeve 13 and having an annular axially extending flange 15. The driven element 12 is generally cylindrical, and its outer surface may, as illustrated, comprise a plain surface to serve as a pulley, or may be provided with gear teeth, sprocket teeth, or the like, as desired. The driven element 12 is provided with an inwardly extending annular flange 16 which is journalled on the sleeve 13 by means of an anti-friction bearing 18. Spaced from the flange 16 and secured in any suitable manner within the driven element 12 is an annular member 17 which serves to support the element 12 on the sleeve 13 by means of a second anti-friction bearing 19. The annular member 17 may, if desired, be made integral with the driven element 12, but preferably takes the form of a separate element, for convenience of assembly. The end of the driven element 12 is closed by a cover plate 20.

The outer surface of the flange 15 of the driving element is provided with a continuous series of semi-cylindrical axially extending grooves 21, as best seen in Figure 2, and the adjacent inner surface of the driven element 12 is provided with a like series of axially extending semi-cylindrical grooves 22. The grooved portion of the driven element 12 closely encircles the grooved flange 15 so that, when at rest, the two members define a circular series of cylindrical chambers, connected by narrow slits, the width of the slits corresponding to the necessary mechanical clearance between the flange 15 and the driven element 12. For convenience in manufacturing, the driving element 11 and driven element 12 may be assembled together, and a series of cylindrical recesses drilled along their line of juncture, to form the complementary semi-cylindrical recesses 21 and 22 in the respective elements, after which the elements are sperated and machined to provide the necessary clearance therebetween.

A cup-shaped pump jacket 23, comprising a cylindrical portion 24 and a disc portion 25, is eccentrically disposed within the flange 15, and is secured thereto by means of screws 26 or other suitable means. The space between the pump jacket 23 and flange 15 will hereinafter be designated as the fluid chamber 27, and communicates with each semi-cylindrical groove 21 by means of ports 28 extending through the flange 15. Disposed within the pump jacket 23 and coaxial with the shaft 10, there is provided a pump rotor 29, which is supported on a shaft 30, the latter extending through a central aperture in the disc portion 25 of the pump jacket. At its opposite end, the shaft 30 is clamped in a split boss 31 carried by a bracket 32, which in turn is secured to any suitable fixed object or framework. The shaft 30 is therefore prevented from rotating, and while the member 29 is described as a rotor, and serves the function of the usual vane pump rotor, it will be understood that the rotor 29 is in fact stationary, while the jacket 23 rotates with the driving element 11 and shaft 10. The rotor 29 is slotted for the reception of spring pressed vanes 33 and 34 (Figure 2), which cooperate with the jacket 23 in the usual manner to effect the pumping action. The pump chamber 29', i. e., the space between the rotor 29 and jacket 23, communicates with the fluid chamber 27 through an outlet port 35 extending through the jacket 23, and with a fluid reservoir to be described, by means of a conduit 36, formed in the pump jacket 23, which in turn communicates with a short pipe 37.

The disc portion 25 of the pump jacket is provided with three spaced valve openings 38 (Figure 3), communicating with the fluid chamber 27, and adapted to be closed by valve elements 39 (Figure 1) carried on a valve disc 40. The latter is rotatably and slidably mounted on the shaft 30 and is adapted to be moved toward and away from the pump jacket 23 to open and close the valve openings 38. The pipe 37 extends through a suitable aperture in the valve disc 40, which is adapted to rotate with the driving element 11 and pump jacket 23.

A cup-shaped cover member 41 is bolted or otherwise suitably secured to the flanged adjacent edge of the driven element 12, to provide a fluid reservoir 41' and to enclose the governing mechanism to be described. The latter comprises a collar 42, loosely mounted on the shaft 30 and separated from the valve disc 40 by a roller bearing 43. A pair of oppositely disposed links 44 are pivotally secured to the collar 42, and a similar pair of links 45 are pivoted to brackets 46 carried on the inner face of the cup-shaped member 41. The flyweights 47 are pivotally secured at the outer ends of the links 44 and 45, to form a centrifugal governor of more or less conventional type, the necessary resistance to the outward movement of the flyweights being provided by a spring 48 under compression between the collar 42 and a disc 49. The latter is separated by a ball bearing 50 from a backing pin 51 which extends through a suitable elongated slot in the shaft 30 and is adjustable along said slot by means of an adjusting screw 52 threaded into the end of the shaft 30 (Figure 5). It will thus be seen that the tension of the spring 48 may be varied at will by means of the screw 52, the spring 48 serving to maintain the pin 51 in engagement with the end of the screw 52 at all times.

The operation of the device is as follows: A suitable quantity of fluid, preferably oil, is maintained in the reservoir 41'. When the driven member 12 is at rest and rotation of the driving shaft 10 is initiated, fluid from the reservoir 41' will be drawn into the fluid chamber 27 through the pipe 37, conduit 36, pump chamber 29' and port 35, where the fluid will be under a certain pressure, depending upon the speed at which the shaft 10 is rotating. The fluid under pressure in the chamber 27 passes out through the ports 28 into the semi-cylindrical grooves 21 of the driving element 11 and, as the latter rotates, will be thrown into the corresponding grooves of the driven element 12, causing the latter to rotate. By virtue of the shape of the complementary grooves of the two elements, and the small clearance between them, it has been found that a relatively large torque may be transmitted by the present device, as compared to previously known hydraulic drives. It has also been found that the torque transmitted, and hence the speed of the driven element relative to the driving element, depends upon the pressure of the fluid in the chamber 27 and hence in the space between the driving and driven elements.

As the driven element 12 approaches the desired speed, the centrifugal governor operates to relieve the pressure of the spring 48 upon the valve disc 40, which latter will accordingly move outwardly, partly opening the valve openings 38, and relieve the pressure in the chamber 27. In this manner, the speed of the driven element 12 is prevented from going above the desired speed, and is effectively regulated at that speed. In order to change the speed of the driven element, it is only necessary to adjust the tension of the spring 48 by means of the adjusting screw 52.

I do not desire to be bound by any theory as to the operation of my novel drive, but it is a fact that the torque transmitted varies with the pressure of the fluid in the chamber 27. One possible explanation, when using oil as the transmission medium, is that since the oil undoubtedly contains a certain amount of entrained air, the higher the pressure in the space between the driving and driven elements, the more oil is present. Of course, when using a compressible medium, it is obvious that the higher the pressure the greater will be the mass of the medium compressed between the driving and driven elements.

From the foregoing it will be apparent that the device of the present invention provides a simple and rugged variable speed drive capable of transmitting a relatively large torque as compared with other hydraulic drives, and having an exceedingly wide range of speed ratios, the speed being automatically maintained at the desired value, but capable of adjustment at will.

Having thus described the invention, what is claimed as new and desired to be secured by Letters Patent is:

1. A variable speed drive comprising a driving shaft, an externally toothed annular member secured on said shaft, a rotatably mounted driven member closely encircling said annular member, said driven member having internal teeth corresponding to the external teeth of said annular member, means for supplying a fluid under pressure to the periphery of said annular member, and means controlled in accordance with the rotational speed of said driven member for varying the pressure of the fluid supplied to the periphery of said annular member.

2. A variable speed drive according to claim 1, said fluid supply means comprising a pump disposed within said annular member and actuated by said driving shaft.

3. A variable speed drive comprising a driving shaft, an annular member secured thereon and having on its periphery a continuous series of axially extending grooves, a rotatably mounted driven member closely encircling said annular member and having on its inner surface a continuous series of axially extending grooves, means for supplying a fluid under pressure to the space between said annular and driven members, and means controlled according to the rotational speed of said driven member for varying the pressure of the fluid supplied to said space.

4. A variable speed drive comprising a driving shaft, an annular member secured thereon and having on its periphery a continuous series of semi-cylindrical axially extending grooves, a driven member closely encircling said annular member and having on its inner surface a corresponding series of semi-cylindrical grooves, means for supplying a fluid under pressure to the space between said annular and driven members, and means restricting the flow of fluid out of said space.

5. A variable speed drive according to claim 4, said fluid supply means comprising a pump disposed within said annular member and actuated by said driving shaft.

6. A variable speed drive according to claim 1, said pressure varying means comprising a centrifugal device including a spring, and manually operated means for varying the tension of said spring.

7. A variable speed drive comprising a driving shaft, a member secured on said shaft having an axially extending peripheral flange, said flange having on its outer surface a continuous series of axially extending grooves, a driven member journalled on said shaft and closely encircling said flange, said driven member having on its inner surface a corresponding series of grooves, a cylindrical pump jacket eccentrically disposed within said flange and forming therewith a fluid chamber, ports connecting said fluid chamber with each said groove in said flange, a fluid reservoir, pump means within said jacket, a conduit connecting said fluid reservoir and said pump means, an outlet port connecting said pump means with said fluid chamber, means for regulating the fluid pressure in said chamber, and means controlled by the rotational speed of said driven member for actuating said pressure control means.

8. A variable speed drive comprising a driving shaft, a member secured on said shaft having an axially extending peripheral flange, said flange having on its outer surface a continuous surface of axially extending grooves, a driven member journalled on said shaft and closely encircling said flange, said driven member having on its inner surface a corresponding series of grooves, a cylindrical pump jacket eccentrically disposed within said flange and forming therewith a fluid chamber, ports connecting said fluid chamber with each said groove in said flange, a fluid reservoir, pump means within said jacket, a conduit connecting said fluid reservoir and said pump means, an outlet port connecting said pump means with said fluid chamber, means for regulating the fluid pressure in said chamber, and means controlled by the rotational speed of said driven member for actuating said pressure control means, said last means comprising a centrifugal device including a spring, and manually operated means for varying the tension of said spring.

9. A variable speed drive comprising a driving shaft, a member secured on said shaft having an axially extending peripheral flange, said flange having on its outer surface a continuous surface of axially extending grooves, a driven member journalled on said shaft and closely encircling said flange, said driven member having on its inner surface a corresponding series of grooves, a cylindrical pump jacket eccentrically disposed within said flange and forming therewith a fluid chamber, ports extending through said flange and connecting said fluid chamber with each said groove in said flange, a fluid reservoir, pump means within said jacket, a conduit connecting said fluid reservoir and said pump means, an outlet port extending through said jacket and connecting said pump means with said fluid chamber, valve means for regulating the fluid pressure in said chamber, and means controlled by the rotational speed of said driven member for actuating said valve means, said last means comprising a centrifugal device including a spring, and manually operated means for varying the tension of said spring.

10. A variable speed drive comprising a driving shaft, a member secured on said shaft and comprising a disc portion having an axially extending peripheral flange, said flange having on its outer surface a continuous surface of semi-cylindrical axially extending grooves, a driven member journalled on said shaft and closely encircling said flange, said driven member having on its inner surface a corresponding series of semi-cylindrical grooves, a cylindrical pump jacket eccentrically disposed within said flange and forming therewith a fluid chamber, ports extending through said flange and connecting said fluid chamber with each said groove in said flange, a fluid reservoir, pump means within said jacket, a conduit connecting said fluid reservoir and said pump means, an outlet port extending through said jacket and connecting said pump means with said fluid chamber, valve means for regulating the fluid pressure in said chamber, and means controlled by the rotational speed of said driven member for actuating said valve means, said last means comprising a centrifugal device including a spring, and manually operated means for varying the tension of said spring.

11. A variable speed drive comprising a rotatable driving member having a generally cylindrical, transversely grooved, external surface, a rotatable driven member affording a generally cylindrical, transversely grooved, internal surface surrounding and disposed in close proximity to said first named surface, means for supplying fluid under pressure between said surfaces, and means for altering the pressure of the fluid thus supplied to vary the speed ratio between said members.

HENRY G. DICKERSON.